United States Patent [19]

Reutler et al.

[11] 4,189,347
[45] Feb. 19, 1980

[54] BASE FOR VESSEL SUBJECT TO HIGH TEMPERATURE, ESPECIALLY FOR A PEBBLE BED REACTOR VESSEL

[75] Inventors: Herbert Reutler, Hohkeppel; Ulrich Müller-Frank, Bergisch Gladbach; Heinz-Josef Klapperich, Cologne, all of Fed. Rep. of Germany

[73] Assignee: Gesellschaft für Hochtemperaturreaktor-Technik mbH, Bergisch Gladbach, Fed. Rep. of Germany

[21] Appl. No.: 824,098

[22] Filed: Aug. 12, 1977

[30] Foreign Application Priority Data

Aug. 12, 1976 [DE] Fed. Rep. of Germany ....... 2636251
Mar. 3, 1977 [DE] Fed. Rep. of Germany ....... 2709172

[51] Int. Cl.² .......................................... G21C 19/28
[52] U.S. Cl. .................................. 176/58 PB; 176/84
[58] Field of Search ............................... 178/58-60, 178/84, 87

[56] References Cited

U.S. PATENT DOCUMENTS

| 3,228,852 | 1/1966 | Holmes et al. | 176/58 PB |
| 3,309,279 | 3/1967 | Ritz | 176/60 |
| 3,607,643 | 9/1971 | Paget | 176/84 |
| 3,676,297 | 7/1972 | Rennie et al. | 176/84 |
| 3,804,711 | 4/1974 | Pettinger et al. | 176/87 |
| 3,960,656 | 6/1976 | Lohnert et al. | 176/87 |

FOREIGN PATENT DOCUMENTS

| 1053109 | 3/1959 | Fed. Rep. of Germany | 176/59 |
| 1808163 | 6/1970 | Fed. Rep. of Germany | 176/87 |
| 2354540 | 5/1975 | Fed. Rep. of Germany | 176/58 PB |
| 1285248 | 8/1972 | United Kingdom | 176/87 |

*Primary Examiner*—Samuel W. Engle
*Assistant Examiner*—S. A. Cangialosi
*Attorney, Agent, or Firm*—Herbert L. Lerner

[57] ABSTRACT

In a reactor vessel for pebble beds at high and varying temperatures having a side wall and a base formed of a multiplicity of stacked blocks of heat-resistant material and held together by an outer cylindrical or polygonal ring and supported on a foundation, the base and the side wall, respectively, being formed of a plurality of sectors having substantially vertical, radial parting lines therebetween, the sectors being supported with slight friction on the foundation and being braced against the outer ring, the sectors having boundary surfaces with a pebble bed, support surfaces on the foundation and abutment surfaces against the outer ring, the respective surfaces of the boundary surfaces, the support surfaces and the abutment surfaces having a convex mutual inclination whereby each of the sectors is held together in itself by external forces and is forced by its own weight and the weight of the pebble bed into a definite position.

8 Claims, 9 Drawing Figures

BASE FOR VESSEL SUBJECT TO HIGH TEMPERATURE, ESPECIALLY FOR A PEBBLE BED REACTOR VESSEL

The invention relates to a vessel which is suited for high, varying temperatures, especially for gas-cooled, high-power nuclear reactors.

Both in gas-cooled nuclear reactors, the cores of which are formed of fuel element blocks, especially of hexagonal cross section, as well as in gas-cooled pebble bed reactors, the base of the reactor vessel is often made of hexagonal blocks or columns formed of graphite or another high temperature-resistant material, such as carbon. The side walls of these vessels are often formed of two layers of graphite or carbon blocks which are stacked on top of one another and are held together in a suitable manner by dowels or tongue-and-groove joints. As the very high operating temperatures of these nuclear reactors, considerable dimensional variations can be expected when the reactors are started-up and shut down, which stress the vessel, especially in horizontal direction. When heated up, the entire graphite structure of the reactor core and of the vessel expands. In order to avoid stress-producing forces, adequately large expansion gaps have to be provided. With repeated heating and cooling, assurance must be provided that these expansion gaps become neither too large nor too small at any location which, upon renewed heating, could cause local stressing forces and consequent damage. In the construction of blast furnaces, these problems have been solved with comparable temperatures, materials and dimensions in a manner which cannot be applied in reactor technology. In a blast furnace, the hard, inner part of the base, which is formed of graphite, expands outwardly into a yielding support, when heated, and deforms the latter plastically. When cooling, gaps would form which become clogged by the contents of the blast furnace and are no longer available as expansion clearance upon renewed heating. Blast furnaces are therefore heated up only once during their existence and then kept continuously at the operating temperature. In large, gas-cooled nuclear reactors, on the other hand, provision must be made for the required expansion clearance to be available but, in addition, restoring forces should be provided which bring all structural parts of the vessel back to their original position when the nuclear reactor cools down.

These restoring forces should always be present in order to prevent loosening of the core components relative to one another under all operating conditions and thereby prevent uncontrollable relative motion. In principle, spring elements could also provide a permanent restoring force, however, they present construction and material problems at high temperatures and under radiation exposure, in the case of nuclear reactors.

It is accordingly an object of the invention to provide a vessel subject to high and varying temperatures, especially for gas-cooled pebble-bed reactors, wherein the side wall and the base of the vessel are formed of a multiplicity of stacked blocks of heat-resistant material and are held together by an outer cylindrical or polygonal ring and supported on a foundation, this vessel being capable of retaining the form thereof even after an extended period of operation and repeated heating-up and cooling-down, and of having no excessive forces exerted on the structural parts employed therein.

With the foregoing and other objects in view, there is provided, in accordance with the invention, in a reactor vessel for pebble beds at high and varying temperatures having a side wall and a base formed of a multiplicity of stacked blocks of heat-resistant materials and held together by an outer cylindrical or polygonal ring and supported on a foundation, the base and the side wall, respectively, being formed of a plurality of sectors having substantially vertical, radial parting lines therebetween, the sectors being supported with slight friction on the foundation and being braced against the outer ring, the sectors having boundary surfaces with a pebble bed, support surfaces on the foundation and abutment surfaces against the outer ring, the respective surfaces of the boundary surfaces, the support surfaces and the abutment surfaces having a convex mutual inclination whereby each of the sectors is held together in itself by external forces and is forced by its own weight and the weight of the pebble bed into a definite position.

The subdivision of the vessel, as just proposed, into coherent sectors or ring sectors with defined parting lines or gaps therebetween has the effect that each of these sectors can freely expand and contact like a monolithic block, although it is formed of several blocks stacked on top of one another. What is avoided thereby is the likelihood that these gaps would add up at some location of the vessel circumference to form excessively large gaps, and would correspondingly become so small at other locations that local restraining forces would occur there. The feature of the sectors being supported and braced with slight friction is realizable with antifriction or roller bearings or other movable elements. The slightness of the friction has the effect that the forces from the bracing and the supporting tend to act approximately perpendicularly to the respective transmission surfaces on the structural parts of the side wall and the base. Since the sum total of the forces transmitted from the pebble bed to a boundary surface likewise acts approximately perpendicularly to this surface, each sector is in itself pressed together due to the convex disposition of these surfaces, and through the inclined disposition, each sector is forced by the weight thereof and the weight of the pebble bed into a defines position. If the outer ring abutment or bracing is considered as fixed, the fixed point for each sector is located where the support surfaces on the foundation and the abutment or bracing surfaces against the outer ring intersect, because all movements can take place rectilinearly from this point. In actuality, the dimensions of the outer ring abutment or bracing also change with the temperature, so that the fixed points of the sectors follow or participate in these changes in the radial direction.

During all expansions caused by temperature, the blocks move, with slight friction and under a calculatable load on the rolling bodies up the inclined planes, and are returned to the original position thereof upon cooling. Since the external dimensions of bodies of materials having high temperature resistence, such as graphite or carbon, are limited, several of these bodies are stacked on top of one another to form a respective column, each of the columns being supported by a rolling body. At the boundary joints between different groups of such columns, overlap can be provided at the marginal or border elements, so that no through-gaps are formed also in the cold condition. This construction is suited, in principle, for bases of any shape, and therefore also for rectangular bases. For high pressures, vessels with circular or polygonal cross sections are advantageously used. In such a case, several ring-segment-shaped groups of columns of trapezoidal cross section are provided, between which radial expansion joints are provided, and the counter-bearing or bracing abutment which absorbs the outwardly directed component of the weight, is formed by an outer, cooled ring or a polygonal wall. The center of the base can serve also as the fixed point for bases with axial symmetry so that no forces act outwardly.

In accordance with another feature of the invention, a first group of roller bodies is disposed on the foundation and supports the sectors, and a second group of roller bodies engages the outer ring and braces the sectors thereagainst, the rollers being mounted as the first and second groups thereof in respective planes, and being disposed in each sector in, respectively, two planes inclined convexly to one another, so as to form substantially convex surfaces, the two substantially convex surfaces being inclined at the same angle to a vertical symmetry plane of the sector.

The rolling bodies proposed, just referred to, act like balls between two planar surfaces i.e. so that the two participating surfaces can shift in the plane thereof relative to each other in any manner. Since a single ball can transmit only small forces because of the point contact and the limited permissible surface pressure of the material used, and since such a ball, for vertical bearing or support surfaces, can be guided and secured against falling down only at considerable expense, two cylindrical rolling bodies are disposed at the side wall in two different planes with a planar rolling surface therebetween, the axes of the rolling bodies being disposed perpendicularly to one another. The cylindrical rolling bodies, disposed with the intersecting axes, act as a sphere between two plane surfaces i.e. they afford free movement within the rolling plane thereof. By means of an appropriate guide and a non-load-supporting gearing, these rolling bodies can also be disposed in vertical planes without falling down. The last-mentioned feature of the invention of disposing rolling bodies in two planes inclined convexly to one another, has the effect that the bearing forces acting approximately perpendicularly to these planes, hold the supported sectors together.

Also, the forces transmitted from the outer ring bracing or abutment onto the side wall sectors have the effect of holding these sectors together.

In accordance with a further feature of the invention, the boundary surfaces of at least one of the sectors between the pebble bed and the base are formed of two surfaces of equal size inclined substantially convexly to one another, and the boundary surfaces of at least one of the sectors between the side wall and the pebble bed are formed of two surfaces of equal size inclined substantially convexly to one another, the two substantially convex surfaces being inclined at the same angle to a vertical symmetry plane of the respective sector.

The just-proposed feature assumes that the radial boundary surfaces of the individual sectors are not in contact with the boundary surfaces of adjacent sectors and also are not stressed by external forces. This construction assumes further that the forces transmitted from the pebble bed to a boundary surface act approximately perpendicularly to this boundary surface. By the proposed disposition of at least two surfaces of equal size, which are inclined substantially convexly to one another and both inclined at the same angle to a vertical symmetry plane of the respective sector, this sector is in itself held together by the forces transmitted from the pebble bed. The two mutually inclined surfaces need not necessarily intersect with a sharp edge. In view of the generally used graphite material, it would appear advantageous for these two surfaces to merge with one another with a slight rounding.

In accordance with an added feature of the invention, the sectors of the side wall have a pentagonal cross section, respectively, and one of the boundary surfaces with the pebble bed and the abutment surface against the outer ring is planar.

The side wall feature, just mentioned, is an extreme case of the feature mentioned just before that. In principle, also a side wall sector of triangular cross section is held together by the external forces acting from all three sides on the boundary surfaces in the manner according to the invention. If one cuts the two equiangular corners from such an isosceles triangle, a pentagon is obtained which has only one plane boundary surface either toward the pebble bed or toward the outer abutment.

In accordance with yet another feature of the invention, the base is formed with a funnel-shaped opening for discharging fuel pebbles from the pebble bed, and the inclination of the roller-body planes between the base and the foundation is opposite to the inclination of the funnel member which is disposed vertically thereabove.

In accordance with yet a further feature of the invention, a plurality of discharge outlets for fuel pebbles of the pebble bed are formed in the base, a parting line extends radially outwardly from each of the discharge outlets, and an annular parting line extending through the middle of all of the discharge outlets, the annular parting line being either substantially circular or polygonal.

The last two features mentioned relate ro pebble bed reactors, the base of which has one or more funnel-shaped, mutually penetrating openings or inclined planes for discharging fuel pebbles or balls downwardly. If the inclination of the roller body-planes between the base and the foundation is set always opposite to the inclination of the base part disposed vertically thereabove, assurance is provided that the external forces caused by the pebble bed and the support hold the respective sector together in itself. Since the shape of the base is determined by flow-technology considerations, the inclination of the rolling-body-planes between the base and the foundation must be disposed accordingly. When several discharge outlets are distributed over the circumference, the radial parting lines or joints must be placed so that they pass through the respective discharge centers and, in addition, a ring-shaped or polygon-like parting line or joint passes through all discharge centers distributed over the periphery. The ring-shaped parting line or joint defines a central, cone-like body, which rests on a number of rolling body-planes inclined from the outside toward the center, and has a fixed point at the center of the vessel. This disposition relates especially to pebble bed reactors such as are described in the German Published Non-Prosecuted Applications DT-OS No. 24 08 926.7 and DT-OS No. 24 56 405.4. As described therein, the cone disposed with an upwardly directed apex in a funnel-shaped base gives the fuel pebbles or balls a vertical velocity which is approximately constant over the cross section and, therefore, has considerable nuclear-physical advantages. All fuel balls or pebbles are burned up nearly uniformly over the cross section to a final state which is economically sensible, so that they only have to pass through the reactor once. This is made possible by a flow cone which is formed of several sectors in polygon-fashion.

However, contrary to the rest of the funnel-shaped base, the joints between these sectors are always closed. By supporting this cone in a funnel-shaped depression or valley of the foundation, which is formed by several rolling body-planes, this cone is held radially together by its own weight and by the weight of the pebble bed resting thereon and is centered at the lower end thereof relatively to a central fixed point.

The support of the outer ring on cylindrical rolling bodies has the effect that, one the one hand, this ring can expand and contact without stressing forces during temperature changes, and that, on the other hand, this ring remains centered relative to the center of the vessel, both of which is necessary for the undisturbed functioning of the reactor vessel. These cylindrical rolling bodies, since they can move only in the radial direction, furthermore, prevent the outer ring from turning relative to the support thereof, which is necessary for the trouble-free functioning of the pipelines penetrating therethrough.

Although the invention is illustrated and described herein as embodied in base for vessel subject to high temperature, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which.

Figure 1:
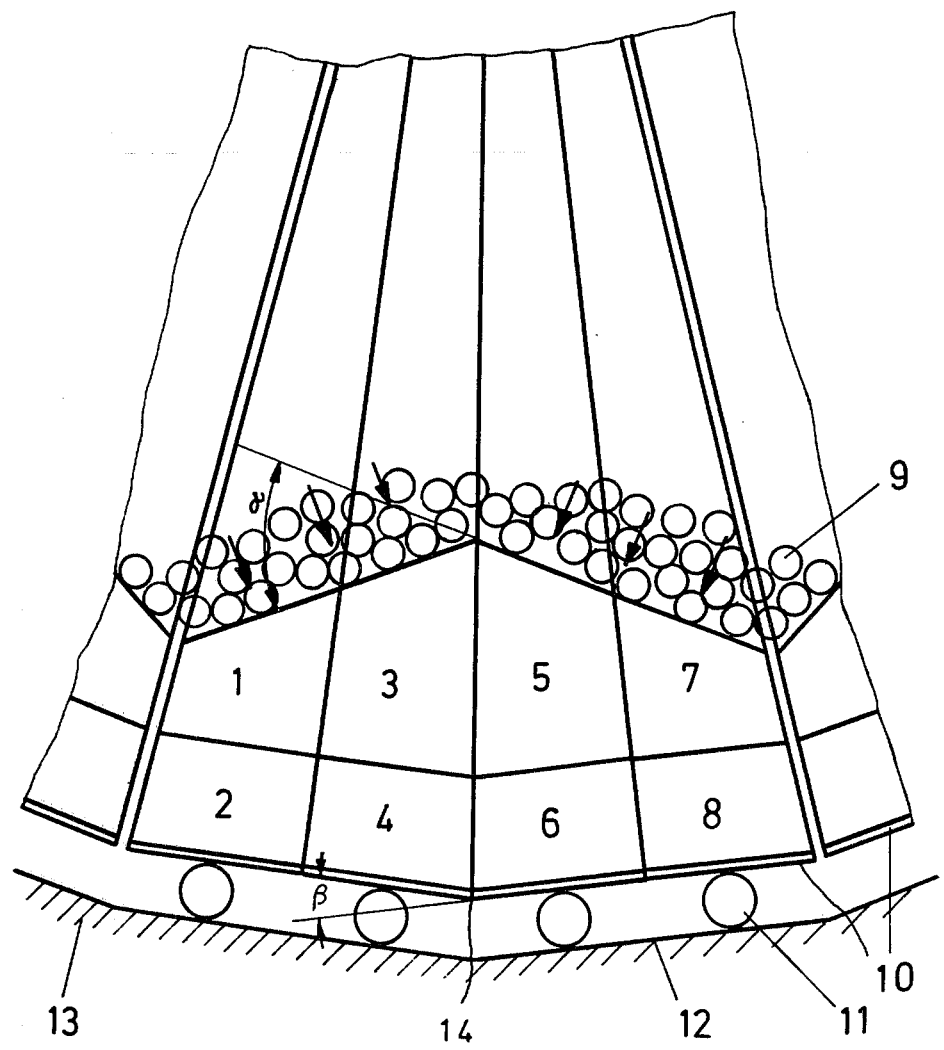
FIG. 1 is a highly diagrammatic fragmentary cross-sectional view taken in a horizontal plane through a side-wall sector of the reactor vessel according to the invention.

Referring now to the drawing and first, particularly, to FIG. 1 thereof, there are shown graphite blocks 1 to 8, disposed in a horizontal plane, and assembled to form a side wall sector of a nuclear reactor vessel which is bounded on two sides by radial parting lines that are not in contact with the adjacent side wall sectors. Toward the pebble bed of numerous fuel spheres 9, provided in the interior of the vessel, this side wall sector is bounded by two surfaces inclined convexly to one another, which are formed by the blocks 1, 3, 5 and 7. Toward the outside, this side wall sector is likewise bounded by two surfaces that are inclined convexly to one another, which are formed by the blocks 2, 4, 6 and 8 and are braced through rolling planes 10 and rolling elements 11 against two rolling planes 12 and 13 which are inclined concavely to one another. Actually, these rolling elements 11 are not spheres but cylindrical rolling elements which, however, act in principle like spheres between two planes. The forces exerted by the pebble bed on the blocks 1, 3, 5 and 7 can be considered, grossly simplified, as acting perpendicularly on the respective surface, even if force directions locally deviating somewhat from the perpendicular are to be expected due to the friction between the fuel spheres 9 and the wall. In the case of the rolling elements 11, on the other hand, it can be assumed that the respective bearing forces are transmitted only perpendicularly to the rolling plane. All in all, the external forces acting upon a side wall sector have the effect that this body, since it cannot absorb any appreciable tensile forces, is held together in the horizontal direction under all operating conditions and is pushed against a fixed point 14 which is located at the intersection of the outer rolling plane thereof. Since the friction at the rolling elements 11 is very much lower than the friction in the boundary surfaces between the pebble bed and the side wall sector, the angle $\beta$ between the two outer rolling planes can be selected so that it is considerably smaller than the angle $\alpha$ between the two inner boundary surfaces. In a non-illustrated vertical section of a base sector, the forces originating from the pebble bed and the support act in a manner similar to those acting in the configuration of FIG. 1 i.e. so that also the base sector is held together and is forced into a defined position.

Figure 2:
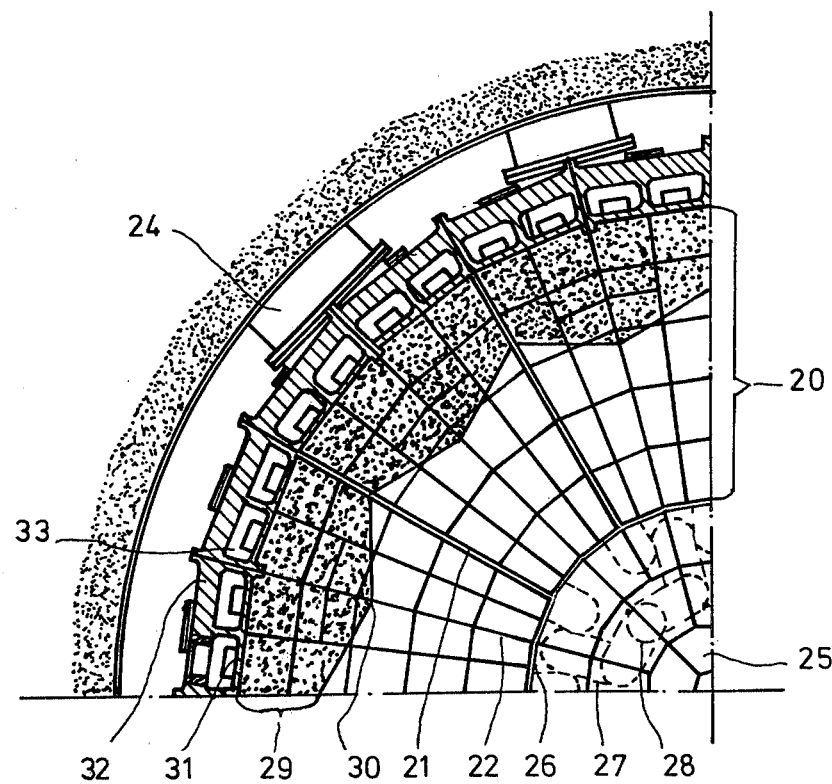
FIG. 2 is a quarter cross-sectional view considerably reduced from that of FIG. 1 of the reactor vessel according to the invention, taken in a horizontal plane along the line A–B in FIG. 3.
Figure 3:
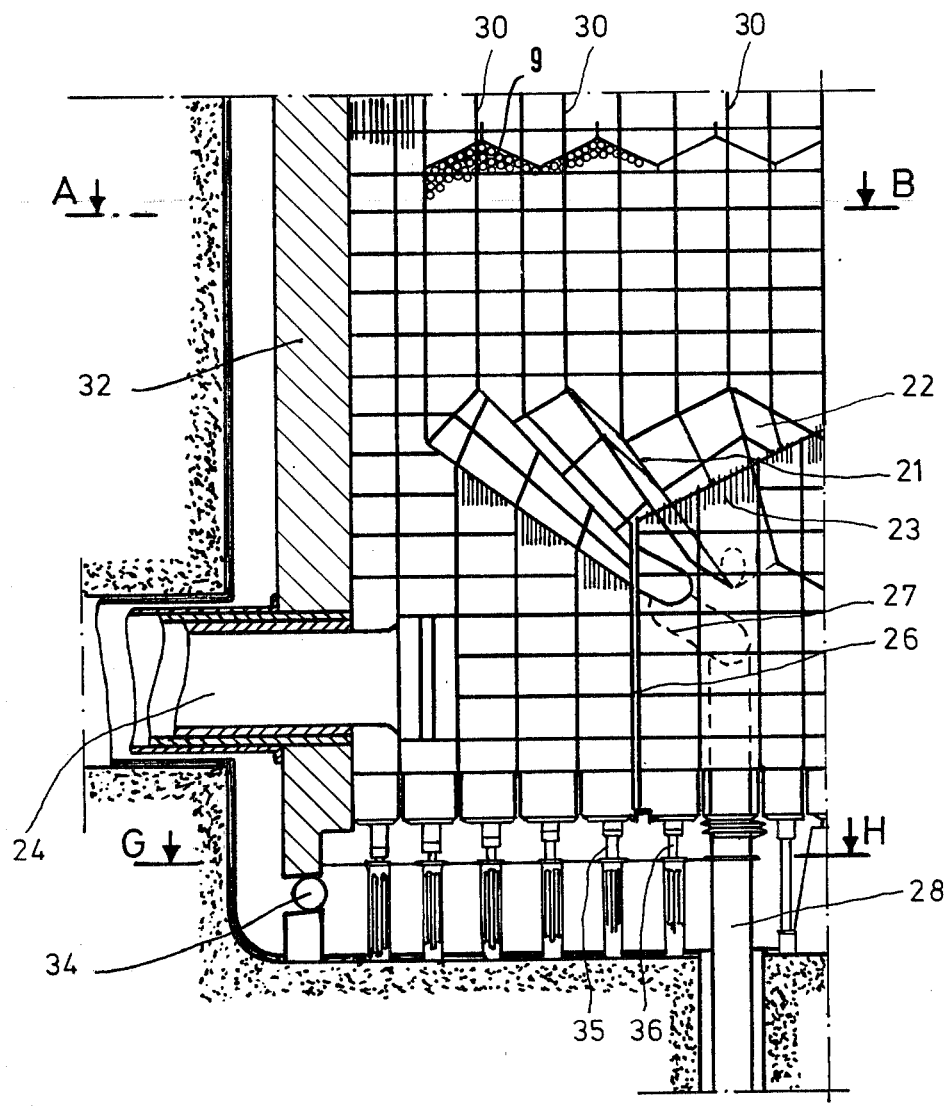
FIG. 3 is a one-half vertical and longitudinal sectional view of part of the reactor vessel according to the invention, showing the support or bearings thereof on the foundation.
Figure 6:
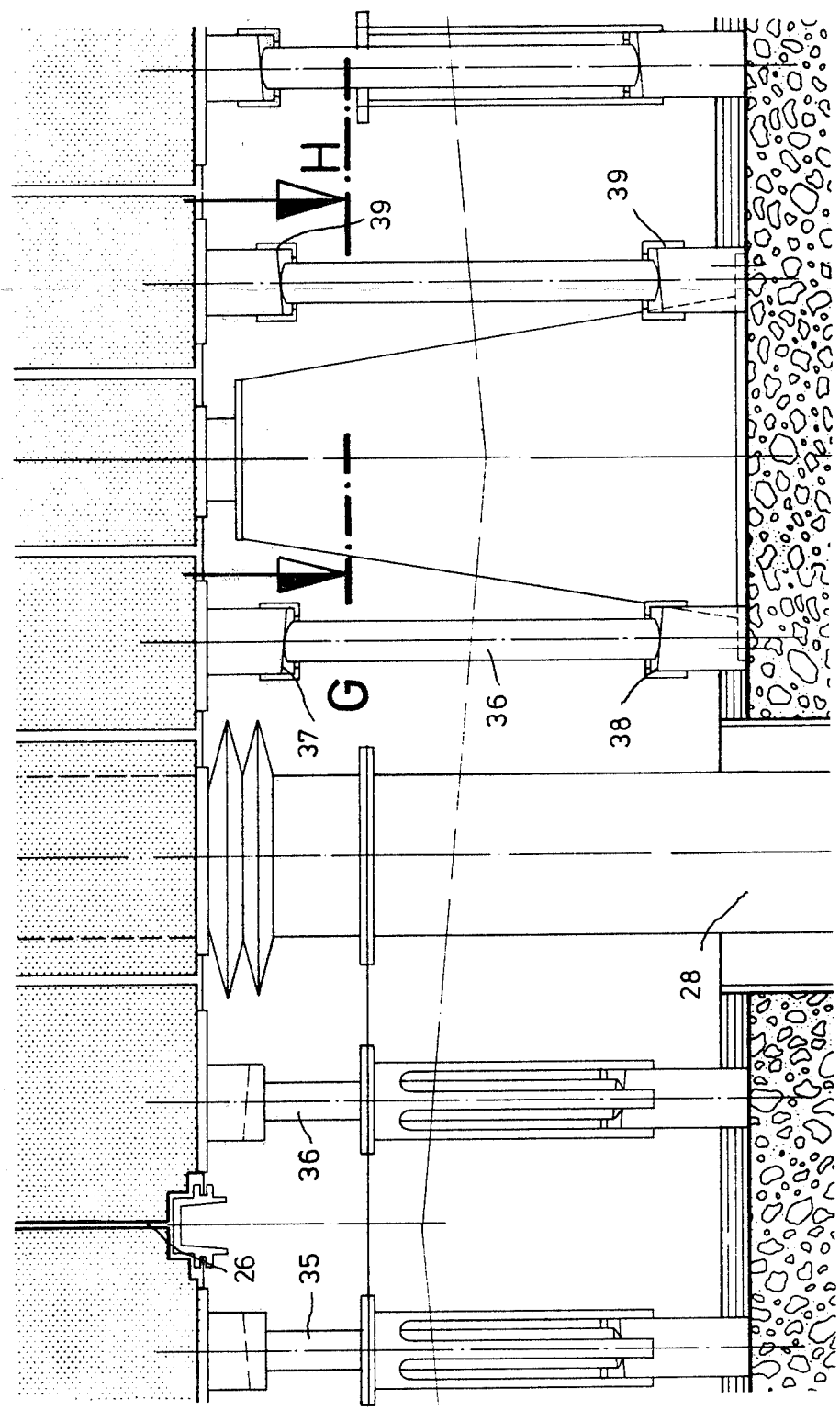
FIG. 6 is a fragmentary enlarged view of FIG. 3 showing, specifically, the support or bearing of the base on the foundation.

In FIGS. 2 and 3, the reactor vessel, shown without cover and without pebble bed, is formed by a total of twelve sectors 20, with parting lines or gaps 21 therebetween. Each of these sectors 20 is made up of numerous blocks, for example, of graphite, and is bounded in the region of the base against the pebble bed in gable roof-shaped fashion with a radial ridge 22 which declines towards the center of the reactor. The blocks which are immediately adjacent to the subsequent pebble bed have numerous vertical, parallel ducts or channels, through which the reactor coolant is conducted, in a manner not otherwise described in detail, to a collecting channel or manifold 24. In the center of the reactor base, a cone-like body 25 with the apex thereof pointing upwardly is disposed. It is similarly constructed of individual blocks and has a polygonal parting line or gap 26 opposite the sectors 20 surrounding it. This cone-like body 25 serves to conduct the fuel spheres away from the center and toward the discharge channels 27, indicated by broken lines, and from there to several discharge tubes 28. The side wall 29, which is likewise constructed of numerous blocks, also has, in direction toward the pebble bed, two boundary surfaces inclined toward each other in gable-roof-fashion with a vertical ridge 30. Toward the outside, the side wall 29 is braced, through rolling bodies disposed in separate cages 31, against a metallic polygonal ring 32, through which numerous vertical ducts 33 pass for cooling purposes. This polygonal ring 32 rests on cylindrical rolling bodies 34 and, when heated, travels outwardly together with the side wall sector 29 and the base sector. The base sectors 20 are supported on separate rolling bodies 35 which are shown in FIG. 6 and described in detail hereinafter. From FIG. 3 it is apparent, however, that these rolling bodies 35 are disposed in planes that ascend or slope upwardly toward the center of the reactor, so that the base sectors 20 are forced outwardly against the polygonal ring 32 by their own weight and the weight of the pebble bed which will subsequently rest thereon. The central cone-like body 25 rests on rolling bodies 36 which, as shown in detail in FIG. 6, are disposed in rolling planes declining or falling off toward the center of the reactor. This body 25 is thereby held uniformly together toward the center by its own weight and due to the weight of the pebble bed resting thereon. This body 25, in fact, also has radial and annular parting lines, however, they are always closed, in contrast with the side wall sectors and the base sectors 20.

Figure 4:
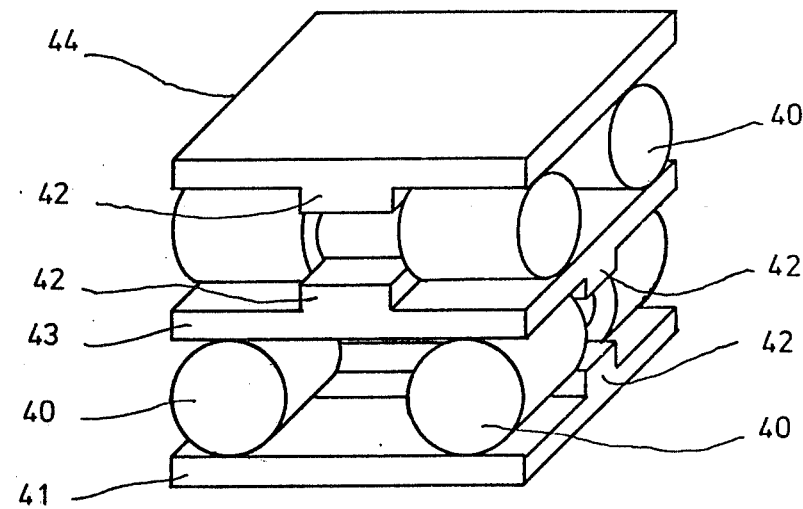
FIG. 4 is an enlarged perspective view of an embodiment of an anti-friction or roller bearing element for use in the invention.

In FIG. 4, respective pairs of cylindrical rolling bodies 40 which are provided with an annular slot, rest on a plate 41 which has a ridge 42 for guiding these rolling bodies 40. On the two lower rolling bodies 40, there is disposed a middle plate 43 which has ridges 42 on the underside and on the upper side thereof which are transposed 90° to one another. Thereabove, again two upper rolling bodies 40 are disposed which are offset 90° relative to the lower rolling bodies and support an upper plate 44 which is also provided with a ridge 42 similarly engaging in the annular slot of the rolling bodies 40. In the illustrated position of FIG. 4, this roller or antifriction bearing is freely movable in horizontal direction and has as an advantage over rolling spheres which are disposed between two planes, that the contact surface and, therefore, the load capacity is greater. If one wishes to dispose such roller or antifriction bearings in vertical planes, as is intended in the invention of the instant application, these rolling bodies must be guided in a conventional manner by gears which mesh with appropriately shaped racks, so that they do not travel downwardly.

Figure 5:
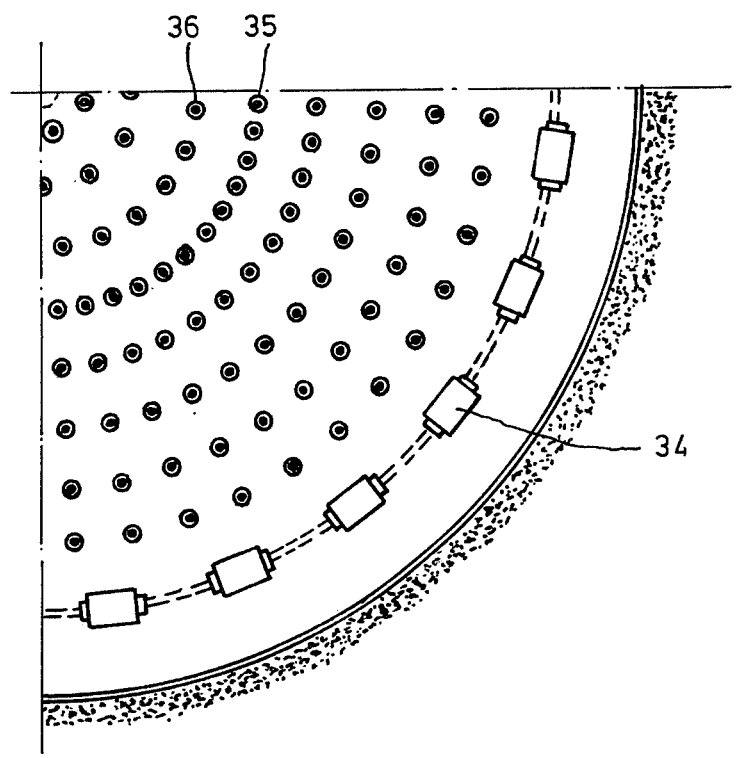
FIG. 5 is a quarter cross-sectional view taken along the line G–H in FIG. 3 which is in a plane disposed between the reactor base and the foundation.

FIG. 5 illustrates how the base sectors 20 are supported on numerous column-shaped rolling bodies 35, and the inner, cone-like body 25 is supported on numerous rolling bodies 36. In addition, FIG. 5 shows the location of the cylindrical rolling bodies 34 for supporting the polygonal ring illustrated in FIGS. 2 and 3.

In FIG. 6, the column-shaped rolling bodies 35 and 36 have, at the respective upper and lower ends thereof, curved rolling surfaces which have a common center of curvature and are supported above and below on inclined but, in themselves, planar rolling surfaces 37 and 38. The displacement paths of the parts supported on rolling bodies 35 and 36 are so small that the contact points of the rolling bodies 35 and 36 with the upper and lower bearing surfaces always remain within the respective spherical or curved rolling surface thereof, and the column-shaped rolling bodies 35 and 36, therefore, cannot topple over. Holders 39 are, nevertheless provided, primarily during assembly to minimize the possibility of toppling. It is of particular importance that all of the rolling bodies 35 belonging to one base sector 20, are disposed in two planes which, on the one hand, are inclined toward one another valley-like and, on the other hand, ascend toward the center of the reactor. In this manner, this base sector is held together in itself and is forced outwardly against the polygonal ring 32. Since the rolling bodies 35 are supposed to permit movements in the respective rolling plane, they must be defined by two spherical surfaces with a common center of curvature. The rolling bodies 36, on the other hand, which support the central, cone-like body 25, may have cylindrical end surfaces, also with a common center of curvature, since this cone-like body 25 can only expand or contract in radial direction.

Figure 7:
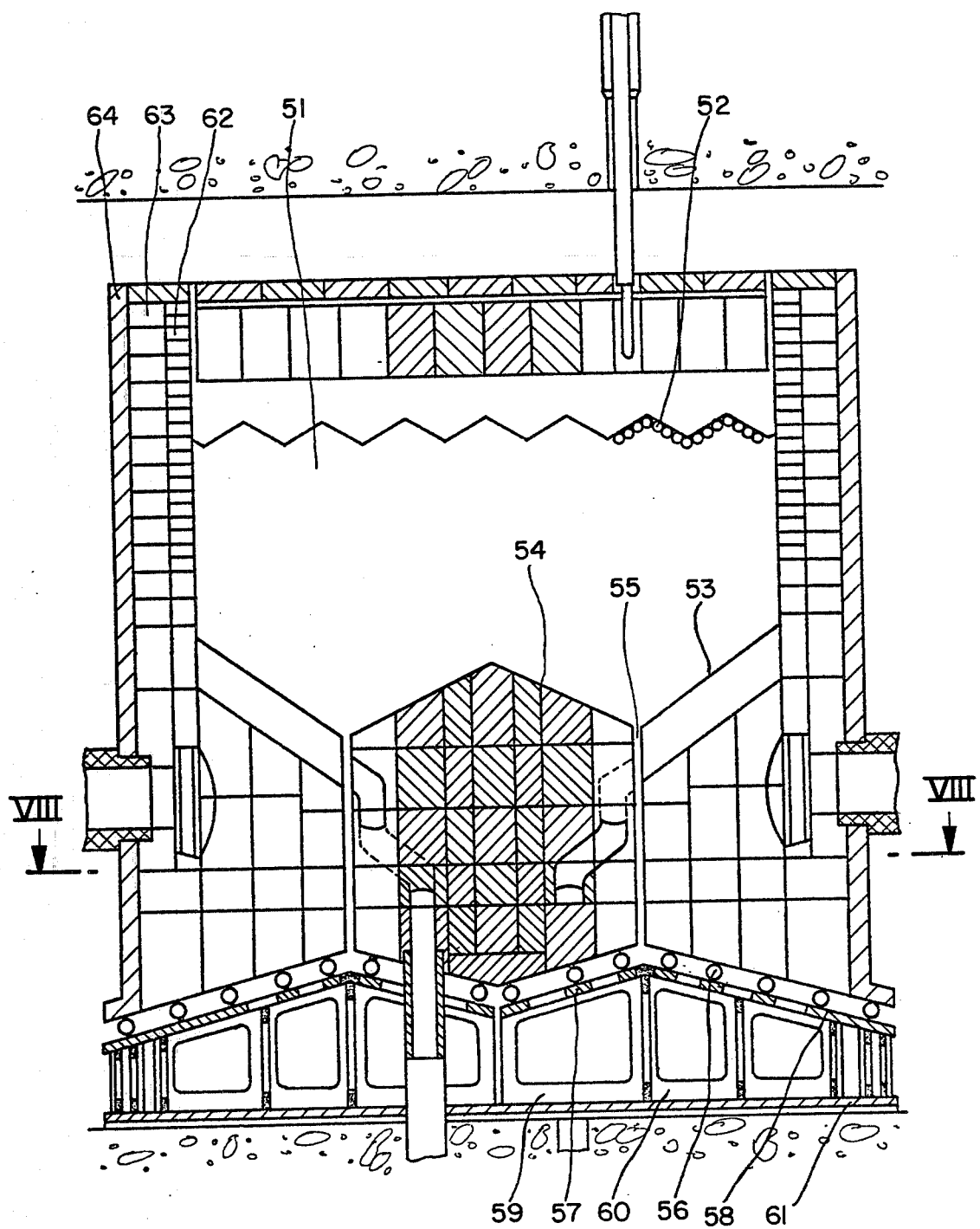
FIG. 7 is a vertical or longitudinal sectional view of another embodiment of the invention in a gas-cooled pebble-bed reactor having a cylindrical core vessel taken along the line VII—VII in FIG. 8.
Figure 8:
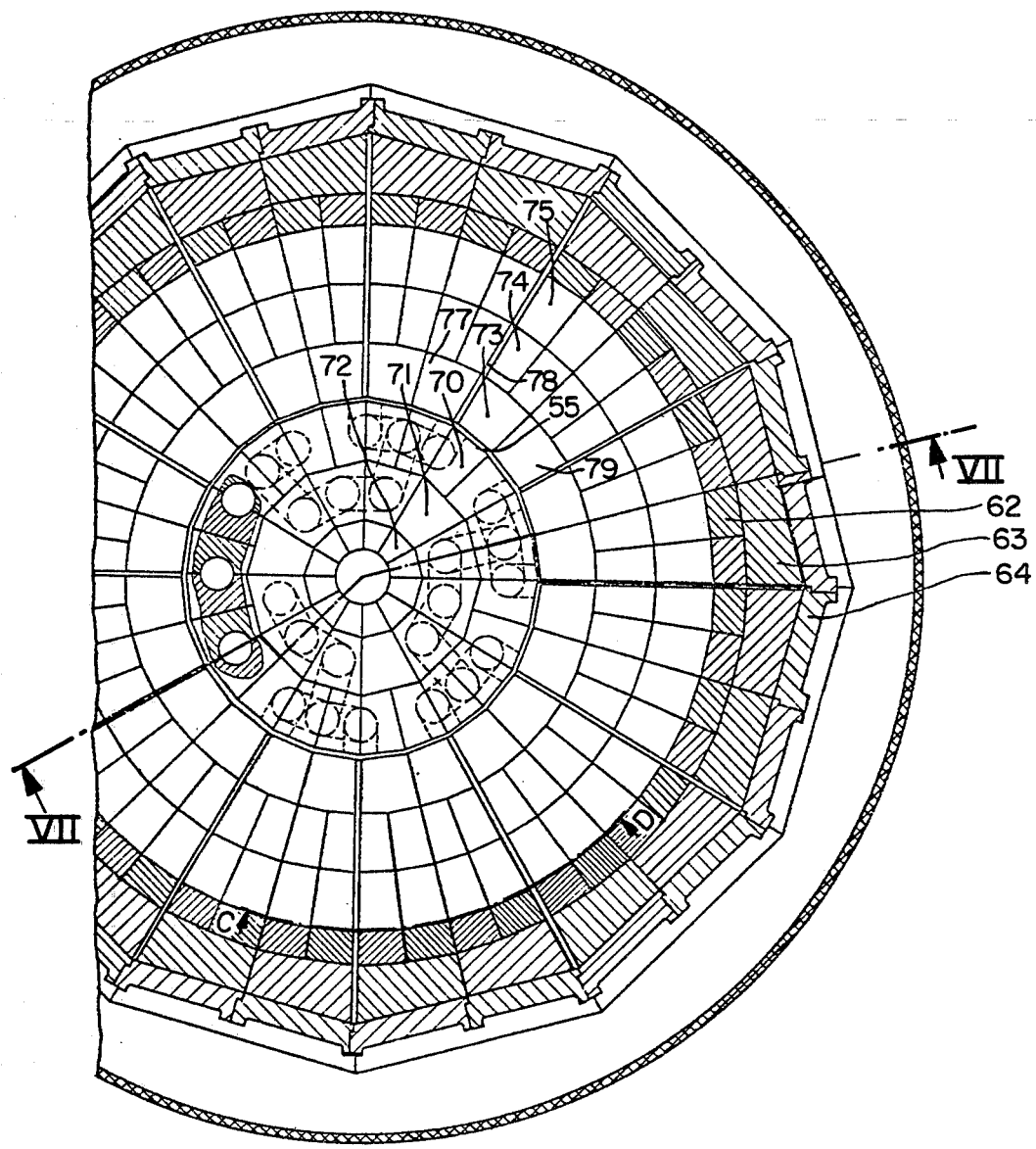
FIG. 8 is a fragmentary horizontal sectional view of FIG. 7 taken along the line VIII—VIII.
Figure 9:
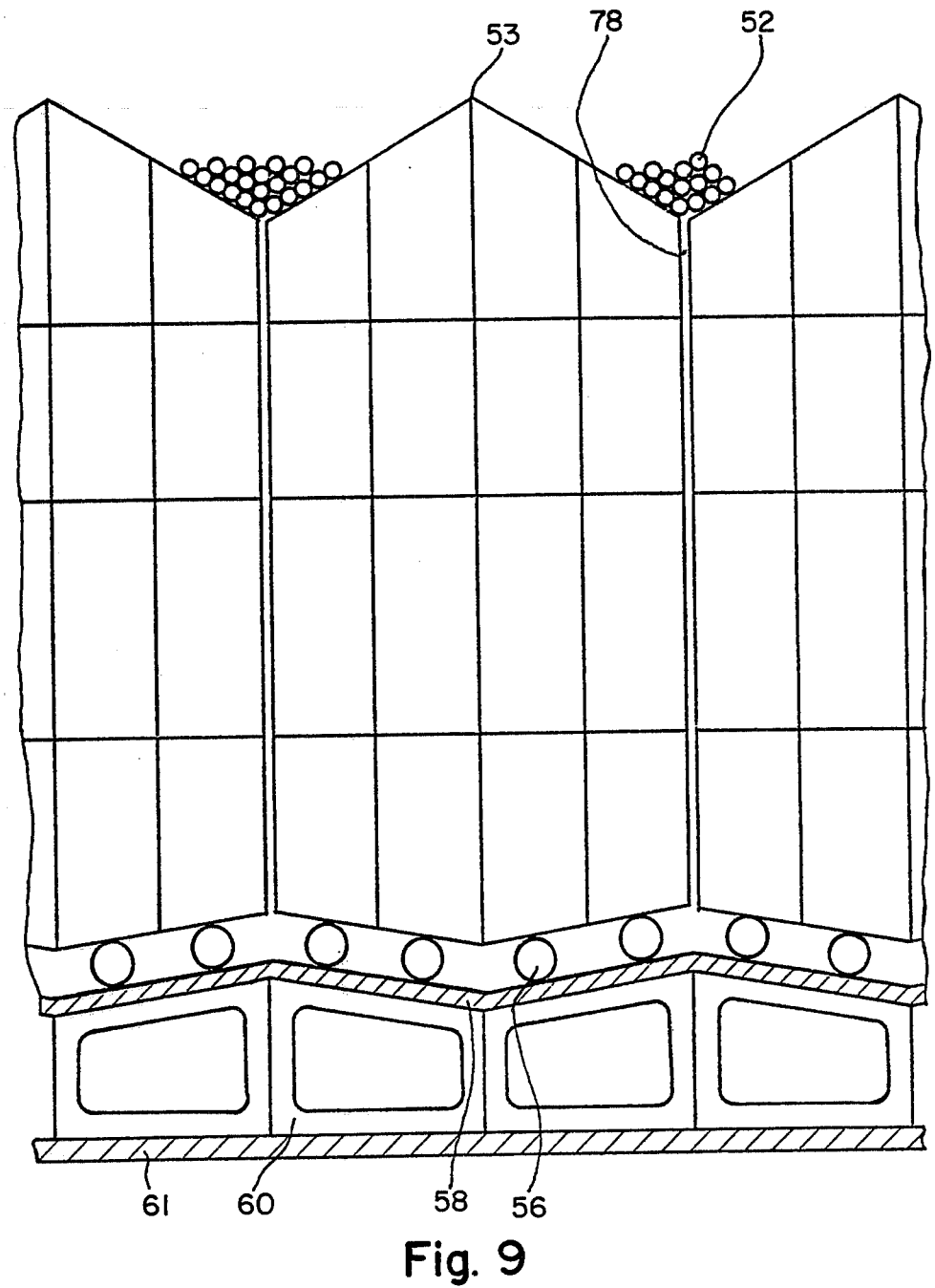
FIG. 9 is an enlarged fragmentary view of FIG. 7 taken along the line C–D in FIG. 8, in the direction of the arrows.

FIGS. 7 to 9 show diagrammatically another embodiment of the invention in a gas-cooled pebble bed reactor with a cylindrical core vessel of about 12 m diameter and 10 m height, which has a funnel-shaped base and a central cone having an upwardly directed apex disposed therein. With a temperature difference i.e. increase, of about 1000° C., the diameter of such a base of graphite would have to expand about 60 mm if no special measures were taken.

In FIGS. 7 and 8, the cylindrical core vessel 51 contains a bed of numerous fuel spheres 52. The base of the vessel 51 is formed of an outer, funnel-shaped part 53 and an inner, conical part 54 with an annular gap 55 therebetween. As is evident from FIG. 7, the funnel 53 and the cone 54 are constructed of numerous blocks, of which several, stacked on top of one another, form a respective column which is supported on a rolling body 56 that, together with other rolling bodies 56, is supported on plates 57 and 58 which, in turn, rest on a horizontal, flat base 61 through the intermediary of foundations 59 and 60. The cylindrical side walls of the core vessel are constructed from the inside to the outside thereof, successively, of a layer of graphite blocks 62 acting as a reflector, a layer, for example, of carbon blocks 63 acting as insulation, and an outer polygonal wall of metallic elements 64 which are bolted together and are cooled from the outside. Since the temperature and, therefore, also the dimensions of this outer polygonal wall change only little, it can be considered as a fixed abutment or bracing for the blocks of the funnel 53 which, upon becoming heated, move radially toward the center of the vessel, on the one hand, and vertically upwardly into the pebble bed, on the other hand. Upon cooling down, these blocks, due to their own weight and the weight of the pebble bed resting thereon, move back again on the inclined plates 8 in radial direction toward the fixed outer abutment. In contrast, the blocks of the inner cone 4, when heated up, expand in radially outward direction, on the one hand, and also upwardly into the pebble bed, on the other hand. Upon cooling down, these blocks travel back again radially toward the center due to their own weight and due to the weight of the pebble bed pushing on their inclined surfaces. In this manner, the blocks of the funnel 53, as well as the blocks of the cone 54 are stressed only in compression.

In FIG. 8, there are again shown both the cone 54 built of the multiplicity of columns of blocks 70, 71 and 72, as well as the outer funnel 53 built of the multiplicity of columns of blocks 73, 74 and 75 which, respectively, form segment-shaped or annular segment-shaped groups. Between adjacent columns of the inner core 54, parting lines or joints but no expansion gaps are provided because the blocks thereof are all forced toward the center due to their own weight. Between the block 70 of the inner core 4 and the block 73 of the outer funnel 53, an annular expansion gap 55 is provided, which is supposed to remain in existence even at the highest possible temperature. Between the block 73 and the radially adjacent block 77, there is likewise provided an expansion gap 78 extending in radial direction, whereas, on the opposite side of the block 73 along the adjacent block 79, in fact, a parting line or joint is provided, but no expansion gap.

FIG. 9 shows, with the same reference numerals applied to like parts as in FIGS. 7 and 8, how the annular or ring segments of the outer funnel 53, that are constructed of a multiplicity of column of blocks, are mounted through roller bearings 56 on the planar base 61. It is apparent therein how the weight of the blocks per se and the weight of the bed of fuel pebbles 52 disposed thereon, hold together the blocks of a ring segment in horizontal direction. It is also readily apparent that the inclination of the plane above the blocks is opposite to the inclination of the roller planes below the blocks, but does not have the same angle of inclination with respect to the horizontal. While the inclination at the upper side of the blocks is determined by the flow characteristics or behavior of the fuel pebbles, the inclination at the underside of the blocks must be selected to be only so great that the friction in the roller bodies is overcome.

There are claimed:

1. In a reactor vessel for pebble beds at high and varying temperatures having a side wall and a base formed of a multiplicity of stacked blocks of heat-resistant material and held together by an outer cylindrical or polygonal ring and supported on a foundation, the base and the side wall, respectively, being formed of a plurality of sectors having substantially vertical, radial parting lines therebetween, said sectors being supported with slight friction on the foundation and being braced against the outer ring, said sectors having boundary surfaces with a pebble bed, support surfaces on the foundation and abutment surfaces against the outer ring, the respective surfaces of said boundary surfaces, said support surfaces and said abutment surfaces having a convex mutual inclination whereby each of said sectors is held together in itself by external forces and is forced by its own weight and the weight of the pebble bed into a definite position.

2. Reactor vessel according to claim 1 including a first group of roller bodies disposed on the foundation and supporting said sectors, and a second group of roller bodies engaging said outer ring and bracing said sectors thereagainst, said rollers being mounted as said first and second groups thereof in respective planes, and being disposed in each sector in, respectively, two planes inclined convexly to one another so as to form two substantially convex surfaces, said two substantially convex surfaces being inclined at the same angle to a vertical symmetry plane of said sector.

3. Reactor vessel according to claim 2 wherein the base is formed with a funnel-shaped opening for discharging fuel pebbles from the pebble bed, and the inclination of the roller-body planes between the base and the foundation is opposite to the inclination of the funnel member which is disposed vertically thereabove.

4. Reactor vessel according to claim 2 including a plurality of discharge outlets for fuel pebbles of the pebble bed formed in the base, a parting line extending radially outwardly from each of said discharge outlets, and an annular parting line extending through the middle of all of said discharge outlets.

5. Reactor vessel according to claim 4 wherein said annular parting line is substantially circular.

6. Reactor vessel according to claim 4 wherein said annular parting line is polygonal.

7. Reactor vessel according to claim 1 wherein the boundary surfaces of at least one of said sectors between the pebble bed and the base are formed of two surfaces of equal size inclined substantially convexly to one another, and the boundary surfaces of at least one of said sectors between the side wall and the pebble bed are formed of two surfaces of equal size inclined substantially convexly to one another, said two substantially convex surfaces being inclined at the same angle to a vertical symmetry plane of the respective sector.

8. Reactor vessel according to claim 1 wherein said sectors of the side wall have a pentagonal cross section, respectively, and one of said boundary surface with the pebble bed and said abutment surface against the outer ring is planar.

* * * * *